E. J. HODGES.
NUT LOCK.
APPLICATION FILED NOV. 29, 1913.
1,113,344.
Patented Oct. 13, 1914.
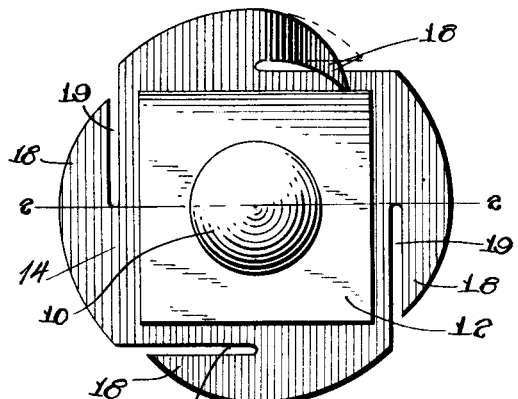
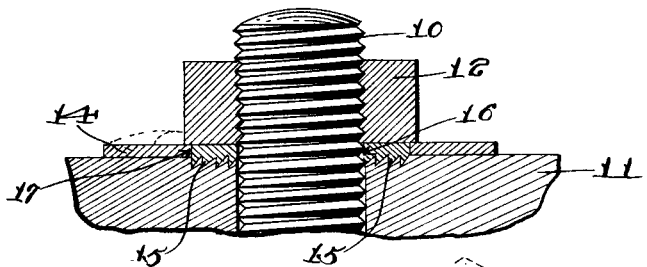
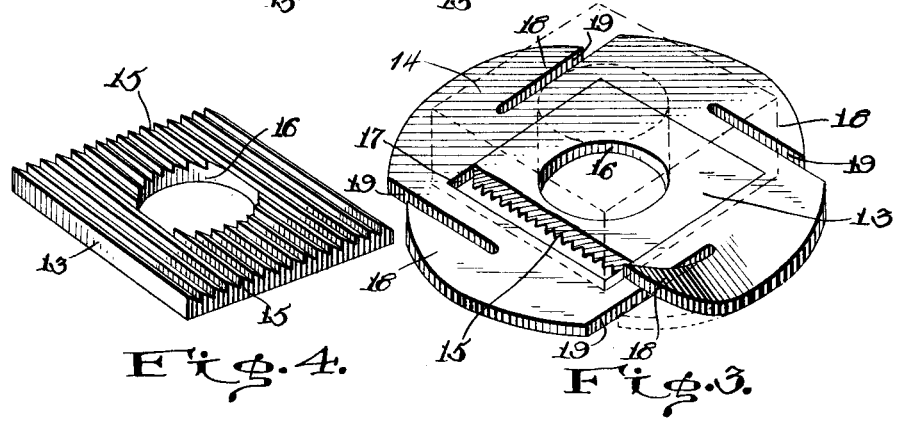
Inventor
Ezra J. Hodges
By
His Attorney
Witnesses
Howard F. Costello
Wade Koontz

UNITED STATES PATENT OFFICE.

EZRA J. HODGES, OF ALGONA, IOWA.

NUT-LOCK.

1,113,344. Specification of Letters Patent. Patented Oct. 13, 1914.

Application filed November 29, 1913. Serial No. 803,715.

*To all whom it may concern:*

Be it known that I, EZRA J. HODGES, a citizen of the United States, residing at Algona, in the county of Kossuth and State of Iowa, have invented certain new and useful Improvements in Nut-Locks, of which the following is a specification, reference being had therein to the accompanying drawing.

This invention relates to nut locks and more particularly to that class which are provided with a gripping washer for engaging the support through which the bolt passes and which has means to engage a nut and prevent the rotation of the same upon the bolt.

The object of this invention is to provide a nut lock of the kind above referred to, that provides a washer made of two parts, a gripping member for a support, and an outer member for engaging a nut.

Another object of this invention is to provide a nut lock of the kind above described which is simple in construction, efficient in operation and consists of the minimum number of parts.

With these and other objects in view, this invention consists of certain novel combinations, constructions and arrangements of parts as will be hereinafter fully described and claimed.

In the accompanying drawing:—Figure 1 is a top plan view of the improved device mounted on a bolt and in engagement with a nut. Fig. 2 is a section taken on line 2—2 of Fig. 1. Fig. 3 is a perspective view of a washer showing a part of the inner member broken away. Fig. 4 is an inverted perspective view of the inner member of the locking washer.

Referring to the parts by reference numerals, the part of the bolt indicated by the numeral 10, passes through an opening in a support 11 and has threaded on its end a nut of the ordinary type 12. The locking device for this nut 12 is positioned between the inner edge of the nut 12 and the support 11. This above mentioned locking means is a washer consisting of an inner member 13 and an outer member 14, said inner member 13 being of greater thickness than the outer member 14, the purpose of which will be hereinafter fully set forth. The inner member 13 is provided on its under face with teeth 15 that are adapted to engage the support 11. This inner member 13 is rectangular in shape and is provided with a central opening 16 for allowing the member to be placed upon the bolt 10. The outer member 14 is provided with a rectangular shaped opening 17 and has on its edge, tongues 18 formed by means of the slits 19. After the bolt has been placed through the opening in the support 11, the inner member of the washer is placed on the bolt and the teeth 15 engage the support 11, the outer member of the washer is then placed upon the bolt, the rectangular shaped opening 17 fitting snugly around the rectangular shaped member 13 and the nut 12 is then threaded upon the bolt 10 until the same comes into engagement with the upper face of the washer, thus forcing the teeth securely in the support 11 inasmuch as the inner member 13 is of greater thickness than the outer member 14. The nut 12 is of greater width than the rectangular inner member 13 thus engaging the outer member 14 of the washer to prevent the same from being accidentally removed, and then to insure the positive locking of the nut one of the tongues 18 is bent into engagement with the side of the nut 10. It is, of course, obvious that all of the tongues 18 can be brought into engagement with the sides of the nut as the device is shown in Fig. 1, but the tongues are provided on all sides of the washer to insure the engagement of the nut at any point that should be necessary.

It is obvious that minor changes may be made in the form and construction of this invention without departing from the spirit thereof. It is, therefore, not wished to confine the invention to the exact form herein shown and described, but it is wished to include all such as properly come within the scope claimed.

What is claimed as new is:—

A nut lock comprising a washer, said washer comprising an inner and outer member, said inner member being rectangular in shape and having teeth formed upon its under face, said outer member having a rectangular opening formed therein adapted to be placed around said inner member, tongues formed on the outer edge of said outer member, said inner member capable of longitudinal movement in said outer member and being of greater thickness than said outer member, whereby when a nut is brought into engagement with said washer, the teeth of said inner member will be forced into a support, thus holding said outer member from rotation, and said tongues of said washer adapted to be bent into engagement with the sides of a nut.

In testimony whereof I hereunto affix my signature in presence of two witnesses.

EZRA J. HODGES.

Witnesses:
J. W. SULLIVAN,
LAURA SCHULZE.

Copies of this patent may be obtained for five cents each, by addressing the "Commissioner of Patents, Washington, D. C."